United States Patent
Kim et al.

(10) Patent No.: US 8,859,131 B2
(45) Date of Patent: Oct. 14, 2014

(54) BATTERY MODULE AND BATTERY PACK INCLUDING THE SAME

(71) Applicant: Samsung SDI Co., Ltd., Yongin-si (KR)

(72) Inventors: Myung-Chul Kim, Yongin-si (KR); Tae-Yong Kim, Yongin-si (KR); Hyun-Ye Lee, Yongin-si (KR); Shi-Dong Park, Yongin-si (KR)

(73) Assignees: Samsung SDI Co., Ltd., Yongin-Si, Gyeonggi-Do (KR); Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/836,084

(22) Filed: Mar. 15, 2013

(65) Prior Publication Data
US 2013/0202937 A1  Aug. 8, 2013

Related U.S. Application Data

(63) Continuation of application No. 12/801,770, filed on Jun. 24, 2010, now Pat. No. 8,420,250.

(30) Foreign Application Priority Data

Dec. 4, 2009  (KR) ........................ 10-2009-0119911

(51) Int. Cl.
*H01M 2/10* (2006.01)
*H01M 10/04* (2006.01)

(52) U.S. Cl.
CPC .......... *H01M 2/1077* (2013.01); *H01M 2/1083* (2013.01); *H01M 10/0413* (2013.01); *Y02E 60/12* (2013.01)
USPC ........................................................ 429/151

(58) Field of Classification Search
None
See application file for complete search history.

(56) References Cited

U.S. PATENT DOCUMENTS

| 6,312,851 | B1 | 11/2001 | Fukuda et al. |
| 2006/0083980 | A1 | 4/2006 | Choo et al. |

(Continued)

FOREIGN PATENT DOCUMENTS

| CN | 1242876 A | 1/2000 |
| EP | 0 962 993 A1 | 12/1999 |

(Continued)

OTHER PUBLICATIONS

European Search Report in EP 10179115.0-1227, dated Dec. 29, 2010 (Kim, et al.).

(Continued)

*Primary Examiner* — Patrick Ryan
*Assistant Examiner* — Wyatt McConnell
(74) *Attorney, Agent, or Firm* — Lee & Morse, P.C.

(57) ABSTRACT

A battery module and battery pack, the battery module including a pair of end plates facing each other; a plurality of battery units arranged in a first direction between the end plates; a first side plate extending along a first side of the plurality of battery units, the first side plate being coupled to the end plates; a second side plate extending along a second side of the plurality of battery units, the second side plate being coupled to the end plates and being disposed opposite to the first side plate; a first coupling member, the first coupling member coupling the end plates to the first side plate; and a second coupling member, the second coupling member coupling the end plates to the second side plate, wherein the first coupling member and the second coupling member are disposed in asymmetrical positions with respect to a central line of the end plates.

20 Claims, 6 Drawing Sheets

(56) References Cited

U.S. PATENT DOCUMENTS

| | | |
|---|---|---|
| 2009/0017367 A1 | 1/2009 | Marubayashi |
| 2009/0111010 A1 | 4/2009 | Okada et al. |
| 2009/0269657 A1 | 10/2009 | Mita et al. |

FOREIGN PATENT DOCUMENTS

| | | |
|---|---|---|
| JP | 11-121024 A | 4/1999 |
| JP | 2001-236937 A | 8/2001 |
| JP | 2004-227788 A | 8/2004 |
| JP | 2006-120489 A | 5/2006 |
| JP | 2008-091183 A | 4/2008 |
| JP | 2009-021048 A | 1/2009 |
| JP | 2009-110833 A | 5/2009 |
| KR | 10 1999-0018295 A | 3/1999 |
| KR | 10-0471174 B1 | 3/2005 |
| KR | 10 2008-0010156 A | 1/2008 |

OTHER PUBLICATIONS

Korean Office Action in KR 10-2009-0119911, dated May 23, 2011 (Kim, et al.).
Korean Notice of Allowance in KR 10-2009-0119911, dated Aug. 24, 2012 (Kim, et al.).
Japanese Office Action in JP 2010-180329, dated Oct. 23, 2012 (Kim, et al.).
Chinese Office Action dated Apr. 2, 2014.

BATTERY MODULE AND BATTERY PACK INCLUDING THE SAME

CROSS REFERENCE TO RELATED APPLICATION

This is a continuation application based on pending application Ser. No. 12/801,770 filed Jun. 24, 2010, the entire contents of which is hereby incorporated by reference.

BACKGROUND

1. Field

Embodiments relate to a battery module and a battery pack including the same.

2. Description of the Related Art

In general, a secondary battery is chargeable and dischargeable, unlike a primary battery that is not rechargeable. The secondary battery may be used as an energy source for, e.g., mobile devices, electric vehicles, hybrid vehicles, electric bicycles, uninterruptible power supplies (UPS), and the like. According to the type of applied external devices, the secondary battery may be used as a single battery or as a battery pack configured by grouping and electrically connecting a plurality of batteries.

A small mobile device, e.g., a mobile phone, may be operated by using an output and capacity of a single battery during a predetermined time. However, a vehicle, e.g., an electric vehicle or a hybrid vehicle, which demands, e.g., high power consumption, a long-term drive, and a high power drive, may use an output and capacity of a battery pack. In this regard, an output voltage or an output current of the battery pack may be increased according to a number of batteries included in the battery pack.

SUMMARY

Embodiments are directed to a battery module and a battery pack including the same, which represent advances over the related art.

It is a feature of an embodiment to provide a battery module and a battery pack for increasing an efficient use of space by being compactly mounted in a limited space.

At least one of the above and other features and advantages may be realized by providing a battery module including a pair of end plates facing each other; a plurality of battery units arranged in a first direction between the end plates; a first side plate extending along a first side of the plurality of battery units, the first side plate being coupled to the end plates; a second side plate extending along a second side of the plurality of battery units, the second side plate being coupled to the end plates and being disposed opposite to the first side plate; a first coupling member, the first coupling member coupling the end plates to the first side plate; and a second coupling member, the second coupling member coupling the end plates to the second side plate, wherein the first coupling member and the second coupling member are disposed in asymmetrical positions with respect to a central line of the end plates.

Each end plate may include a base plate disposed adjacent to the plurality of battery units; a first flange part, the first flange part being bent from a first side of the base plate in a direction away from the plurality of battery units; and a second flange part, the second flange part being bent from a second side of the base plate in a direction away from the plurality of battery units.

The first coupling member may couple the first flange part to the first side plate, and the second coupling member may couple the second flange part to the second side plate.

The battery module may further include a third coupling member further coupling the end plates and the first side plate together with the first coupling member; and a fourth coupling member further coupling the end plates and the second side plate together with the second coupling member.

The first and third coupling members and the second and fourth coupling members may be arranged in asymmetrical positions with respect to the central line of the end plates.

The first, second, third, and fourth coupling members may be arranged at first, second, third, and fourth heights that are different with respect to a third side perpendicular to the first and second sides.

The first and second coupling members may include a bolt and a nut, and may couple the end plates and the side plates with the bolt and the nut.

The battery module may further include an upper plate extending along a third side of the plurality of battery units, the upper plate being coupled to the pair of end plates; and a lower plate extending along a fourth side of the plurality of battery units, the lower plate being coupled to the pair of end plates.

At least one of the above and other features and advantages may also be realized by providing a battery pack including a plurality of battery modules, each battery module including a pair of end plates facing each other; a plurality of battery units arranged in a first direction between the end plates; a first side plate extending along a first side of the plurality of battery units, the first side plate being coupled to the end plates; a second side plate extending along a second side of the plurality of battery units, the second side plate being coupled to the end plates and being disposed opposite to the first side plate; a first coupling member, the first coupling member coupling the end plates to the first side plate; and a second coupling member, the second coupling member coupling the end plates to the second side plate, wherein the first coupling member and the second coupling member are disposed in asymmetrical positions with respect to a central line of the end plates.

Each end plate may include a base plate disposed adjacent to the plurality of battery units; a first flange part, the first flange part being bent from a first side of the base plate in a direction away from the plurality of battery units; and a second flange part, the second flange part being bent from a second side of the base plate in a direction away from the plurality of battery units.

The first coupling member may couple the first flange part to the first side plate, and the second coupling member may couple the second flange part to the second side plate.

The battery pack may further include a third coupling member further coupling the end plates and the first side plate together with the first coupling member; and a fourth coupling member further coupling the end plates and the second side plate together with the second coupling member.

The first and third coupling members and the second and fourth coupling members may be arranged in asymmetrical positions with respect to the central line of the end plates.

The first, second, third, and fourth coupling members may be arranged at first, second, third, and fourth heights that are different with respect to a third side perpendicular to the first and second sides.

The first and second coupling members may include a bolt and a nut, and may couple the end plates and the side plates with the bolt and the nut.

The battery pack may further include an upper plate extending along a third side of the plurality of battery units, the upper plate being coupled to the pair of end plates; and a lower plate extending along a fourth side of the plurality of battery units, the lower plate being coupled to the pair of end plates.

The plurality of battery modules may be arranged in a second direction perpendicular to the first direction.

The plurality of battery modules arranged in the second direction may be disposed such that the first and second coupling members are adjacent to and offset from each other.

The plurality of battery modules may include one set of battery modules arranged in a second direction perpendicular to the first direction and a second set of battery modules arranged in a third direction perpendicular to the first and second directions.

The second set of battery modules arranged in the third direction may be disposed such that the first and second coupling members of respective battery modules adjacent to each other in the third direction are aligned.

The embodiments may be realized by providing a battery module including a pair of end plates facing each other; a plurality of battery units arranged in a first direction between the end plates; at least one first restraint member extending along a first side of the plurality of battery units, the at least one first restraint member being coupled to the end plates; at least one second restraint member extending along a second side of the plurality of battery units, the at least one second restraint member being coupled to the end plates and being disposed opposite to the first restraint member; a first coupling structure, the first coupling structure coupling one of the end plates to the at least one first restraint member; a second coupling structure, the second coupling structure coupling the one end plate to the at least one second restraint member, wherein the first coupling structure is asymmetrical with respect to the second coupling structure about a central line of the one end plate, the central line extending in a plane of the one end plate and being equidistant from the first restraint member and the second restraint member.

The first restraint member may include all restraining members extending along the first side of the plurality of battery units, and the second restraint member may include all restraining members extending along the second side of the plurality of battery units.

Each end plate may include a base plate disposed adjacent to the plurality of battery units; a first flange part, the first flange part being bent from a first side of the base plate in a direction away from the plurality of battery units; and a second flange part, the second flange part being bent from a second side of the base plate in a direction away from the plurality of battery units.

The first coupling structure may couple the first flange part to the first restraint member, and the second coupling structure may couple the second flange part to the second restraint member.

The first and second coupling structures may include a bolt and a nut, and may couple the one end plate and the restraint members with the bolt and the nut.

The first coupling structure may include a bolt and a nut, the second coupling structure may include a bolt and a nut, and the bolt and nut of the first coupling structure may be arranged asymmetrically about the central line with respect to the bolt and the nut of the second coupling structure.

The first coupling structure may include a plurality of corresponding bolts and nuts arranged in a first configuration, the second coupling structure may include a plurality of corresponding bolts and nuts arranged in a second configuration, and the first configuration may be asymmetrical about the central line with respect to the second configuration.

The battery module may further include an upper connector extending along a third side of the plurality of battery units, the upper connector being coupled to the pair of end plates; and a lower connector extending along a fourth side of the plurality of battery units, the lower connector being coupled to the pair of end plates.

Figure 1:
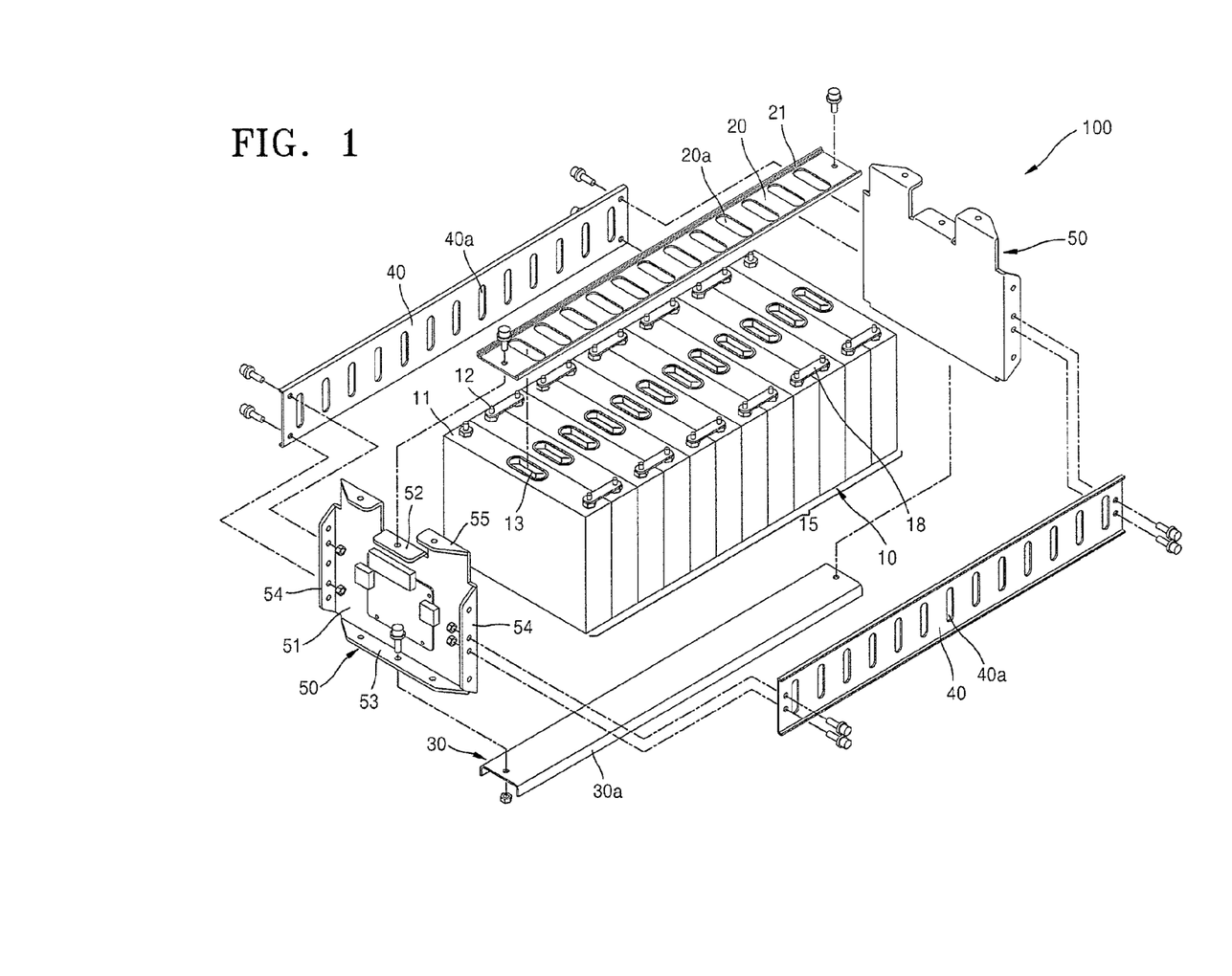
FIG. 1 illustrates an exploded perspective view of a battery module according to an embodiment.

Each end plate of the pair of end plates may be asymmetrical with respect to the central line. For example, as illustrated in FIG. 1, the end plate may include coupling holes for coupling with the first coupling structure and the second coupling structure. An arrangement of the coupling holes (e.g., on the first flange part) for coupling with the first coupling structure may be asymmetrical about the central line with respect to an arrangement of coupling holes (e.g., on the second flange part) for coupling with the second coupling structure.

The embodiments may also be realized by providing a battery pack including a plurality of battery modules, one battery module of the plurality of battery modules including a pair of end plates facing each other; a plurality of battery units arranged in a first direction between the end plates; at least one first restraint member extending along a first side of the plurality of battery units, the at least one first restraint member being coupled to the end plates; a first coupling structure, the first coupling structure coupling one of the end plates to the at least one first restraint member; a laterally adjacent battery module being laterally adjacent to the one battery module in a lateral arrangement direction perpendicular to the first direction and including a pair of end plates facing each other; a plurality of battery units arranged in the first direction between the end plates; at least one second restraint member extending along a second side of the plurality of battery units, the at least one second restraint member being coupled to the end plates; a second coupling structure, the second coupling structure coupling one end plate of the pair of end plates to the at least one second restraint member, wherein the first coupling structure of the one battery module is adjacent to the second coupling structure of the laterally adjacent battery module, and the first coupling structure of the one battery module is asymmetrical with respect to the second coupling structure of the laterally adjacent battery module about a plane perpendicular to the lateral arrangement direction of the one battery module and the laterally adjacent battery module.

The one battery module may further includes at least one second restraint member extending along a second side of the plurality of battery units, the at least one second restraint member being coupled to the end plates and being disposed opposite to the first restraint member, and a second coupling structure, the second coupling structure coupling the one end plate to the at least one second restraint member, wherein the first coupling structure is asymmetrical with respect to the second coupling structure of the one battery module about a central line of the one end plate, the central line extending in a plane of the end plate and being equidistant from the first restraint member and the second restraint member wherein the laterally adjacent battery module further includes at least one first restraint member extending along a first side of the plurality of battery units, the at least one first restraint member being coupled to the end plates, and a first coupling structure, the first coupling structure coupling one of the end plates to the at least one first restraint member, and wherein the first coupling structure is asymmetrical with respect to the second coupling structure of the laterally adjacent battery module about a central line of the one end plate, the central line extending in a plane of the end plate and being equidistant from the first restraint member and the second restraint member.

The first and second coupling structures may include a bolt and a nut, and may couple the one end plate and the restraint members with the bolt and the nut.

The first coupling structure may include a bolt and a nut, the second coupling structure may include a bolt and a nut, and the bolt and nut of the first coupling structure may be arranged asymmetrically about the central line with respect to the bolt and the nut of the second coupling structure.

The first coupling structure may include a plurality of corresponding bolts and nuts arranged in a first configuration, the second coupling structure may include a plurality of corresponding bolts and nuts arranged in a second configuration, and the first configuration may be asymmetrical about the central line with respect to the second configuration.

Each end plate may include a base plate disposed adjacent to the plurality of battery units; a first flange part, the first flange part being bent from a first side of the base plate in a direction away from the plurality of battery units; and a second flange part, the second flange part being bent from a second side of the base plate in a direction away from the plurality of battery units.

The first coupling structure may couple the first flange part to the first restraint member, and the second coupling structure may couple the second flange part to the second restraint member.

Each of the battery modules may further include an upper connector extending along a third side of the plurality of battery units, the upper connector being coupled to the pair of end plates; and a lower connector extending along a fourth side of the plurality of battery units, the lower connector being coupled to the pair of end plates.

The plurality of battery modules may include one set of laterally adjacent battery modules arranged in the lateral arrangement direction and another set of laterally adjacent battery modules arranged in a third direction perpendicular to the first direction and the lateral arrangement direction.

The other set of laterally adjacent battery modules arranged in the third direction may be disposed such that first and second coupling members of respective battery modules adjacent to each other in the third direction are aligned in the third direction.

The plurality of battery modules may be coupled together with another coupling structure.

In each battery module of the plurality of battery modules the first restraint member may include all restraining members extending along the first side of the plurality of battery cells, and the second restraint member may include all restraining members extending along the second side of the plurality of battery cells.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Korean Patent Application No. 10-2009-0119911, filed on Dec. 14, 2009, in the Korean Intellectual Property Office, and entitled: "Battery Module and Battery Pack Including the Same," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when an element is referred to as being "between" two elements, it can be the only element between the two elements, or one or more intervening elements may also be present. Like reference numerals refer to like elements throughout.

Reference will now be made in detail to embodiments of a battery module and a battery pack, examples of which are illustrated in the accompanying drawings. Throughout the specification, the battery pack may be configured by including one or more battery modules and then by forming an electrical connection between the one or more battery modules, wherein each battery module may include a plurality of battery units arranged in a single direction.

Figure 2:
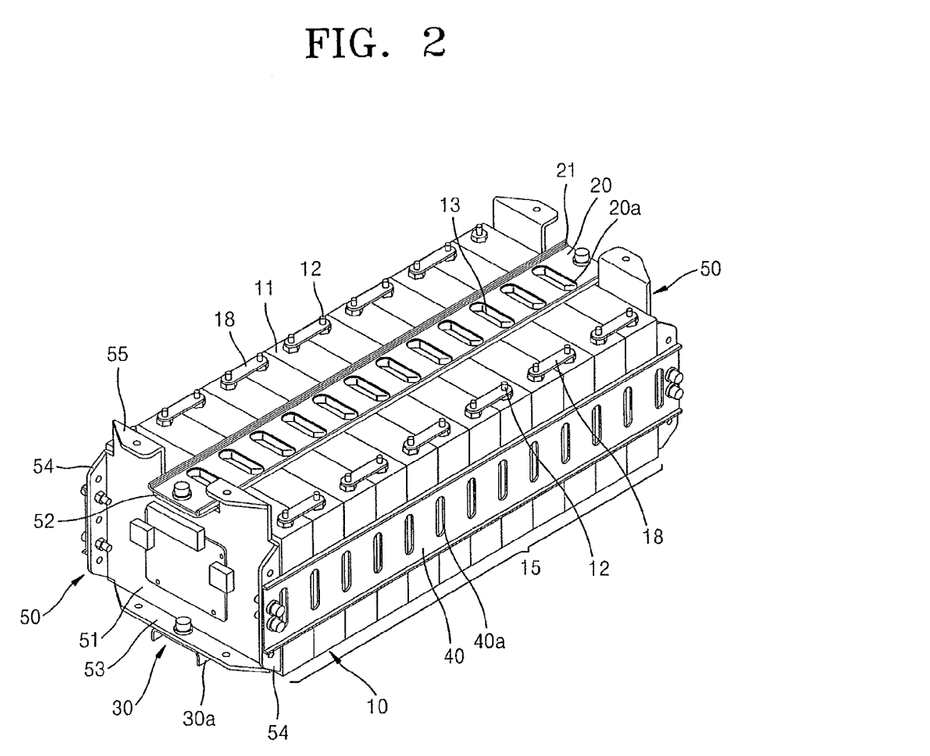
FIG. 2 illustrates a perspective view of an assembled state of the battery module of FIG. 1.

FIG. 1 illustrates an exploded perspective view of a battery module 100 according to an embodiment. FIG. 2 illustrates a perspective view of an assembled state of the battery module 100. Referring to FIGS. 1 and 2, the battery module 100 may include a plurality of battery units 10 that are arranged to form a battery array 15 and plates, e.g., an upper plate 20, a lower plate 30, side plates 40, and end plates 50, surrounding the battery array 15. The battery units 10 may be disposed in a single direction while forming the battery array 15, i.e., the battery module 100 may have a structure in which the battery units 10 are stacked to form battery arrays 15.

In an implementation, each battery unit 10 may include a secondary battery including, e.g., a lithium ion battery. However, the secondary battery may include various other types of secondary batteries, e.g., a cylindrical secondary battery, an angled secondary battery, or a polymer secondary battery, and thus the embodiments are not limited to one type of battery. Each battery unit 10 may include an electrode assembly (not illustrated), a case 11, and electrode terminals 12. The electrode assembly (not illustrated) may include a positive electrode (not illustrated), a separator (not illustrated), and a negative electrode (not illustrated), and may have, e.g., a wound structure or a stacked structure. The case 11 may accommodate the electrode assembly and each electrode terminal 12 may protrude from the case 11 to form an electrical connection between the electrode assembly and an external circuit. The battery units 10 may be electrically connected to each other, e.g., in parallel or in series, via a connection between the electrode terminals 12. In an implementation, the electrode terminals 12 may be connected to each other via bus bars 18. A safety vent 13 may be formed in the case 11. The safety vent 13 may be relatively less rigid than other parts of the case 11 and may vent a gas by being broken when an internal pressure exceeds a predetermined pressure in the case 11.

A pair of the end plates 50 may be disposed at ends of the battery array 15. One surface of each end plate 50 may be in close contact with a surface of the battery unit 10 at each end of the battery array 15. The pair of end plates 50 may group the battery units 15, thereby configuring the battery array 15 as one unit. Accordingly, the pair of end plates 50 may prevent deterioration of an electric characteristic of a battery by inhibiting volume expansion of the battery units 10 due to charging and discharging operations and by maintaining a resistance characteristic of the battery.

Each end plate 50 may include a base plate 51 and flange parts 52, 53, 54, and 55 bent from ends of the base plate 51. The base plate 51 may have an area that is sufficient to cover an external side surface of each battery unit 10 at the ends of the battery array 15.

The flange parts 52, 53, 54, and 55 may be bent from the ends of the base plate 51 in an inverse direction of, i.e., away from, the battery array 15. In an implementation, the flange parts 53 and 54 may be formed as one whole part, i.e., integrally formed, with the base plate 51, without being cut from the base plate 51 at left and right ends or a lower end of the base plate 51. In an implementation, the flange parts 52 and 55 may be separated from each other in such a manner that an upper end of the base plate 51 is cut and bent to form the flange parts 52 and 55 having different heights. The flange parts 52, 53, 54, and 55 may function as couplers for forming a coupling connection between the end plate 50 and another member and may vary in structure according to a connection state with the other member. Also, the flange parts 52, 53, 54, and 55 may reinforce mechanical rigidity of the end plate 50. A plurality of coupling holes may be formed in the flange parts 52, 53, 54, and 55.

The end plate 50 may be coupled to the opposing other end plate 50 via the side plates 40. The side plates 40 may couple the end plate 50 and the opposite other end plate 50 that form the pair. Each side plate 40 may extend along a side surface of the battery array 15 and may have two ends that are coupled to the end plate 50 and the opposite other end plate 50, respectively. Each side plate 40 may have a strip shape with a long axis extending in a single direction. Each side plate 40 may be coupled to each flange part 54 bent from the left and right ends of the end plate 50. In this regard, each side plate 40 and each flange part 54 may overlap to align respective coupling holes thereof. Each side plate 40 and each flange part 54 may then be coupled by coupling members including, e.g., a bolt and a nut. By doing so, each side plate 40 and each flange part 54 may form a surface contact by which each side plate 40 and each flange part 54 at least partly contact each other.

A plurality of heat emission holes 40a may be formed in each side plate 40. For example, the heat emission holes 40a may be formed in each side plate 40 at regular intervals in a longitudinal direction, i.e., along the long axis thereof. The heat emission holes 40a may allow contact between each battery unit 10 and outside air, thus rapidly dissipating heat generated in each battery unit 10.

The lower plate 30 may be disposed below the battery array 15. The lower plate 30 may extend along a bottom side of the battery array 15 and may be connected to lower portions of the pair of end plates 50. The lower plate 30 may have a strip shape with bent parts 30a that are bent in such a manner that ends of the bent parts 30a face each other, i.e., are bent away from the battery array 15. The lower plate 30 may physically support the battery module 100 including the battery array 15. Further, bending strength of the lower plate 30 may be reinforced by the bent parts 30a.

The lower plate 30 may be coupled to the flange part 53 that is bent from a lower end of the end plate 50. In this regard, the lower plate 30 and the flange part 53 may overlap to align respective coupling holes thereof and may then be coupled by coupling members including, e.g., a bolt and a nut. By doing so, the lower plate 30 and the flange part 53 may form a surface contact by which the lower plate 30 and the flange part 53 at least partly contact each other.

The upper plate 20 may be disposed above the battery array 15. The upper plate 20 may extend along a top side of the battery array 15 and may be connected to upper portions of the pair of end plates 50. The upper plate 20 may have a strip shape having bent parts 21 that are bent in such a manner that ends of the bent parts 21 may face each other, i.e., may be bent away from the battery array 15. The upper plate 20 may have openings 20a formed therein in a longitudinal direction thereof so as to allow the openings 20a to correspond to the safety vents 13 of the battery units 10. The upper plate 20 may be coupled to the flange part 52 that is bent from an upper end of the end plate 50. In this regard, the upper plate 20 and the flange part 52 may overlap to align respective coupling holes thereof and may then be coupled by coupling members including, e.g., a bolt and a nut. By doing so, the upper plate 20 and the flange part 52 may form a surface contact by which the upper plate 20 and the flange part 52 at least partly contact each other.

Figure 3:
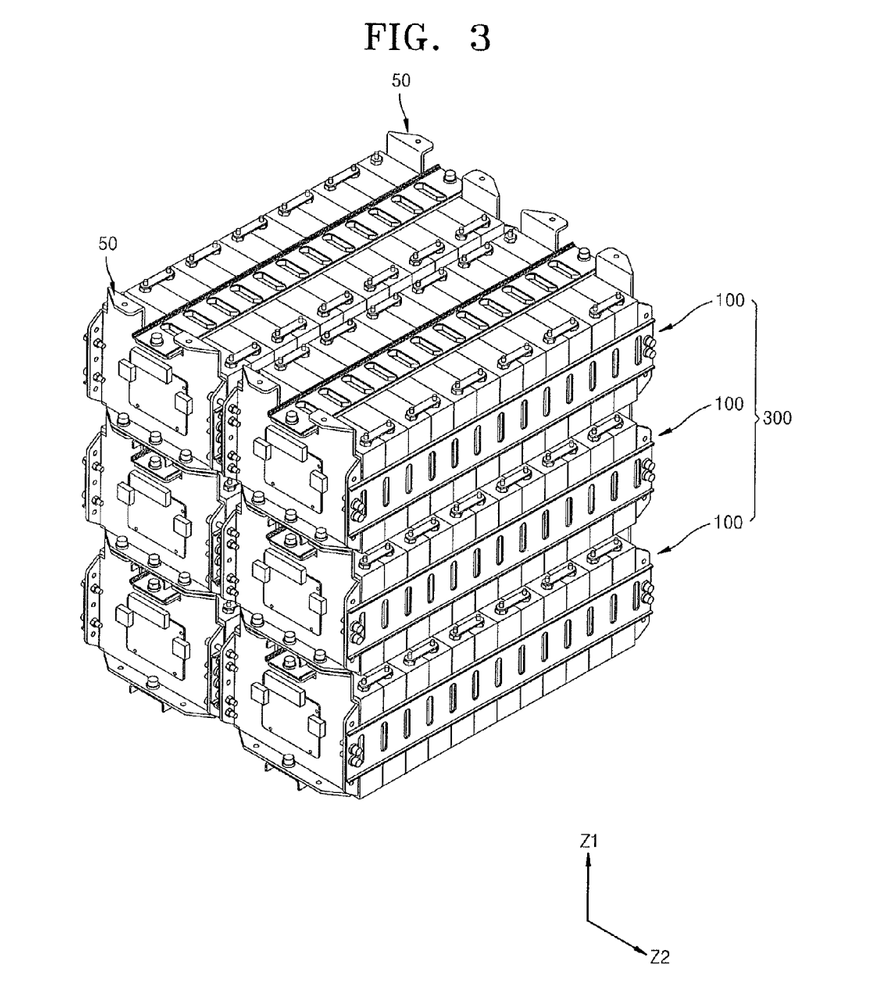
FIG. 3 illustrates a perspective view of a battery pack according to an embodiment configured by coupling the battery modules of FIG. 2.

FIG. 3 illustrates a perspective view of a battery pack 300 according to an embodiment formed by coupling the battery modules 100 of FIG. 2. Referring to FIG. 3, the battery pack 300 may include a collection of battery modules 100 formed in such a manner that the battery modules 100 are stacked in a vertical direction Z1 and a horizontal direction Z2. The number of battery modules 100 used to configure the battery pack 300 may be determined in consideration of a charge and discharge current and capacity as demanded in a design specification. The battery modules 100 used to form the battery pack 300 may form a mutual electrical connection or may be connected in series or in parallel.

Figure 4:
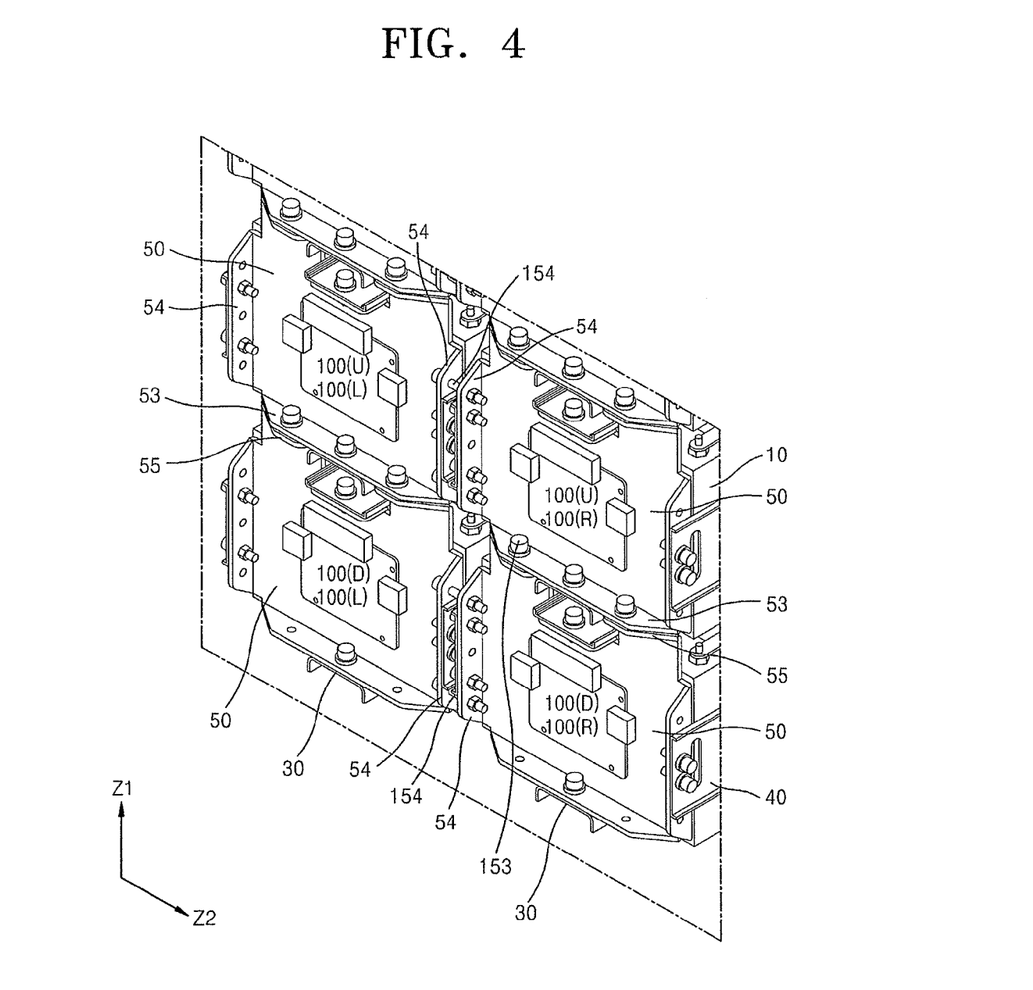
FIG. 4 illustrates a magnified view of an end plate of FIG. 3.

Coupling between adjacent battery modules 100 may be achieved by coupling the end plates 50 at external ends of the battery modules 100. FIG. 4 illustrates a magnified view of the end plates 50 of FIG. 3. In FIG. 4, letters U, D, L, and R that are written in parentheses together with reference numerals indicate relative positions of the battery modules 100 so as to indicate the battery modules 100 disposed at an upper side U, a lower side D, a left side L, and a right side R, respectively. For example, the battery module 100 disposed at an upper-left side may be indicated as the battery module 100(U) or 100(L).

Regarding coupling between the battery modules 100 that are disposed in the vertical direction Z1, the upper battery module 100(U) and the lower battery module 100(D) may be aligned and disposed with respect to each other in the vertical direction Z1. The lower flange part 53 of the upper battery module 100(U) may be disposed at a lower end of the upper battery module 100(U) and the upper flange part 55 of the lower battery module 100(D) may be disposed at an upper end of the lower battery module 100(D). The lower and upper flange parts 53 and 55 of the upper and lower battery modules 100(U) and 100(D) may overlap to align their respective coupling holes. Then, the upper and lower battery modules 100(U) and 100(D) may be coupled by using first coupling members 153 in the coupling holes, e.g., coupling between the upper and lower battery modules 100(U) and 100(D) may be achieved by inserting bolts into the coupling holes and then fastening the bolts with nuts. Here, the lower and upper flange parts 53 and 55 of the upper and lower battery modules 100(U) and 100(D) may form a surface contact by which the lower and upper flange parts 53 and 55 at least partly contact each other. Due to the surface contact between the lower and upper flange parts 53 and 55, the upper battery module 100 (U) may be physically supported by the lower battery module 100(D).

Regarding coupling between the left and right battery modules 100(L) and 100(R) that are disposed in the horizontal direction Z2, e.g., the left battery module 100(L) and the right battery module 100(R) may be disposed in a same horizontal level. A pair of respective flange parts 54 facing each other may be disposed on a right end of the left battery module 100(L) and a left end of the right battery module 100(R). Here, the flange parts 54 of the left and right battery modules 100(L) and 100(R) may overlap to align their respective coupling holes. Then, the left and right battery modules 100(L) and 100(R) may be coupled by using second coupling members 154 in the coupling holes, e.g., coupling between the left and right battery modules 100(L) and 100(R) may be achieved by inserting bolts into the coupling holes and then fastening the bolts with nuts.

Figure 5:
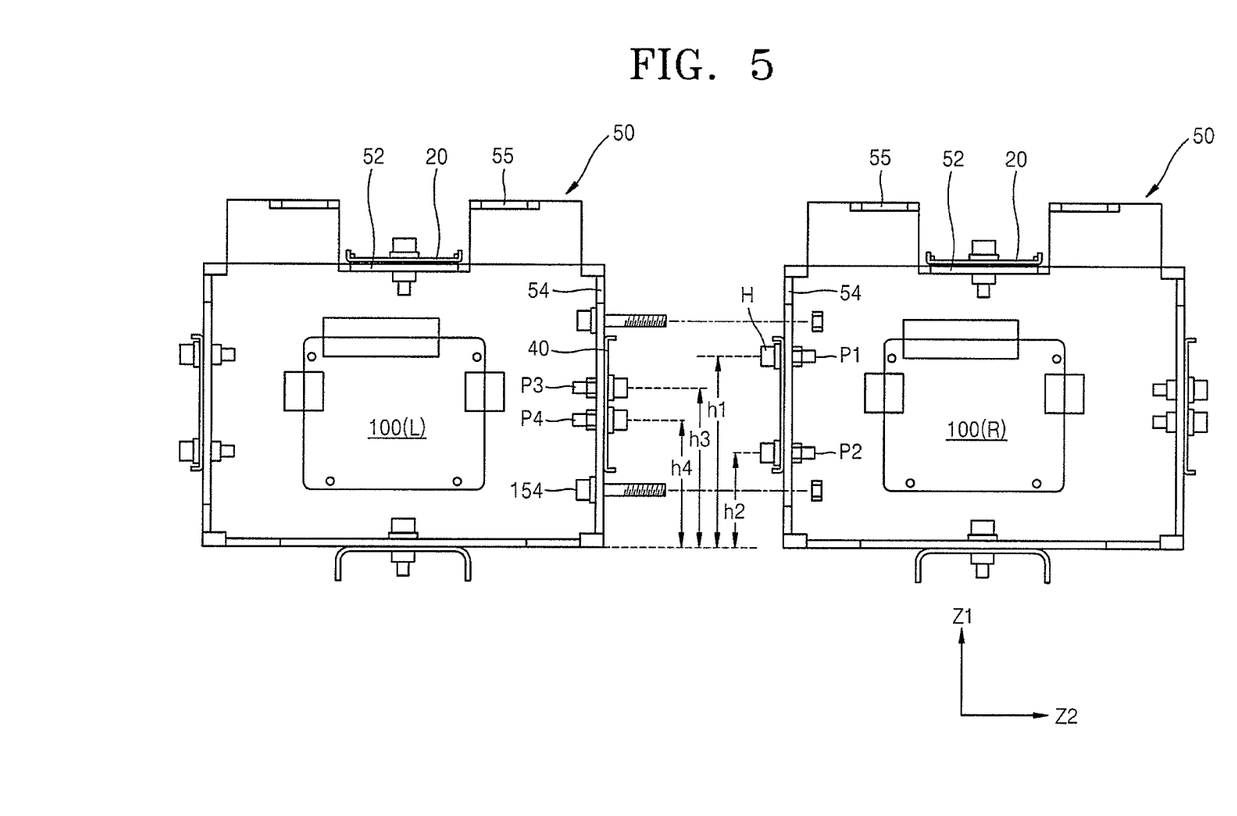
FIGS. 5 and 6 illustrate schematic views showing that the first through fourth coupling members between an end plate and a side plate are arranged in asymmetrical positions.

FIG. 5 illustrates a diagram of a coupling state of the left and right battery modules 100(L) and 100(R) disposed in a horizontal direction. Referring to FIG. 5, coupling members P1, P2, P3, and P4, e.g., bolts and nuts for fixing the side plates 40, may be coupled in flange parts 54 in the left and right battery modules 100(L) and 100(R) that face each other. For example, in a bolt-nut coupling method, a head portion H of a bolt may protrude toward the neighboring, i.e., adjacent, battery module 100. Here, the coupling members P1, P2, P3, and P4 of the left and right battery modules 100(L) and 100(R) may be designed to not overlap each other so that, when the left and right battery modules 100(L) and 100(R) are coupled to each other, interference between the coupling members P1, P2, P3, and P4 may not occur. In particular, the coupling members P1, P2, P3, and P4 may be disposed in different positions, e.g., at different heights h1, h2, h3, and h4, so that the neighboring battery modules 100 may be closely disposed and the battery modules 100 may be disposed in a limited space. By contrast, if the coupling members P1, P2, P3, and P4 of the neighboring battery modules 100 overlap, a gap at least twice as large as a thickness of the head portion H of the bolt may be necessary. Accordingly, the battery pack of an embodiment may be ideally suited for use in a smaller space.

By asymmetrically designing left and right sides of the battery modules 100, the coupling members P1, P2, P3, and P4 having protruding structures may be disposed in the different positions (e.g. at the different heights h1, h2, h3, and h4) without any interference with respect to each other so that a gap between the battery modules 100 may be minimized. Accordingly, the battery pack 300 may have a more compact structure.

In this manner, by coupling the end plates 50 of the battery modules 100 arranged in the vertical and horizontal directions Z1 and Z2, the battery modules 100 may be grouped as one battery pack 300. In an implementation, the end plates 50 may be coupled not only by mechanical coupling using bolts-nuts but also by welding.

Figure 6:
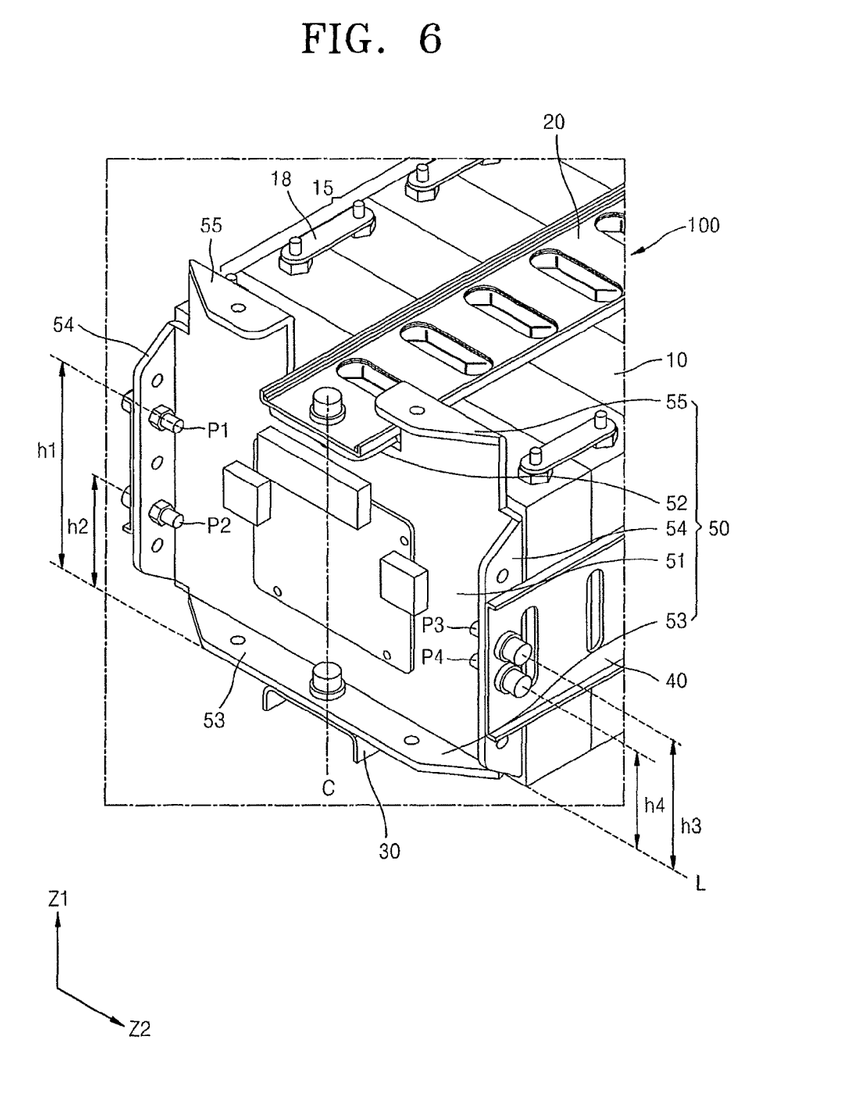

FIG. 6 illustrates a magnified view of the end plate 50 of the battery module 100. Referring to FIG. 6, the end plate 50 may include the base plate 51 and the flange parts 52, 53, 54, and 55, which may be bent from ends of the base plate 51. The flange parts 52, 53, 54, and 55 may include the upper-central flange part 52 that is bent from an upper portion of the base plate 51, the upper side flange part 55 adjacent to the upper-central flange part 52, the lower flange part 53 that is bent from a lower portion of the base plate 51, and the left and right flange parts 54 that are bent from left and right ends of the base plate 51.

The upper plate 20 may be coupled to the upper-central flange part 52. The upper plate 20 may extend along the top side of the battery array 15 and may be coupled to the upper-central flange part 52 of each of the end plates 50 that are disposed at both ends of the battery array 15. The lower plate 30 may be coupled to the lower flange part 53. The lower plate 30 may extend along the bottom side of the battery array 15 and may be coupled to the lower flange part 53 of each of the end plates 50 that are disposed at both ends of the battery array 15.

The coupling members P1, P2, P3, and P4 including, e.g., bolts and nuts, for fixing the side plates 40 may be coupled in the flange parts 54. The coupling members P1, P2, P3, and P4 arranged at left and right sides may be coupled in asymmetrical positions with respect to a central line C of the end plate 50, i.e., the coupling members P1, P2, P3, and P4 may be arranged at the different heights h1, h2, h3, and h4. For example, the first and second coupling members P1 and P2 to be coupled to the left flange part 54 may be disposed at outer sides along the vertical direction Z1 (i.e., heights h1 and h2); and the third and fourth coupling members P3 and P4 to be coupled to the right flange part 54 may be disposed at inner sides along the vertical direction Z1 (i.e., heights h3 and h4). Accordingly, the coupling members P1, P2, P3, and P4 may be arranged at the first through fourth heights h1, h2, h3, and h4 that are different from each other with respect to a reference line L. In an implementation, the battery modules 100 arranged in the second direction perpendicular to the first direction may be aligned such that the first coupling members of one of the battery modules 100 are adjacent to and offset from the second coupling members of an adjacent battery module 100 in the second direction. In an implementation, the battery modules 100 arranged in the third direction perpendicular to the first and second directions may be arranged such that the first and second coupling members of one of the battery modules 100 are aligned in the third direction with the first and second coupling members, respectively, of an adjacent battery module 100 in the third direction.

As described above, according to the embodiments, by asymmetrically designing coupling positions of the coupling members that protrude outside of the battery module, the battery pack configured by coupling the plurality of battery modules may be closely packed. Accordingly, external dimensions of the battery pack may be reduced so that the battery pack may be efficiently mounted in a limited space and space efficiency may be increased.

The battery pack of an embodiment may include the plurality of batteries in consideration of the output voltage or the output current and may be included in a small mounting space in a vehicle or the like due to increased mounting efficiency in consideration of space.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A battery module, comprising:
a pair of end plates facing each other;
a plurality of battery units arranged in a first direction between the end plates;
at least one first restraint member extending along a first side of the plurality of battery units, the at least one first restraint member being coupled to the end plates;
at least one second restraint member extending along a second side of the plurality of battery units, the at least one second restraint member being coupled to the end plates and being disposed opposite to the first restraint member;
a first coupling structure, the first coupling structure coupling one of the end plates to the at least one first restraint member;
a second coupling structure, the second coupling structure coupling the one end plate to the at least one second restraint member,
wherein the first coupling structure is asymmetrical with respect to the second coupling structure about a central line of the one end plate such that the first coupling structure couples the one end plate to the at least one first restraint member at a first height from a bottom of the one end plate and the second coupling structure couples the one end plate to the at least one second restraint member at a second height from a bottom of the one end plate,
wherein the second height is different from the first height, and
wherein the central line extends in a plane of the one end plate and is equidistant from the first restraint member and the second restraint member, and
wherein a first lateral edge of the one end plate that is coupled with the first restraint member is free of any coupling structure at the second height.

2. The battery module as claimed in claim 1, wherein:
the first restraint member includes all restraining members extending along the first side of the plurality of battery units, and
the second restraint member includes all restraining members extending along the second side of the plurality of battery units.

3. The battery module as claimed in claim 1, wherein each end plate includes:
a base plate disposed adjacent to the plurality of battery units;
a first flange part, the first flange part being bent from a first side of the base plate in a direction away from the plurality of battery units; and
a second flange part, the second flange part being bent from a second side of the base plate in a direction away from the plurality of battery units.

4. The battery module as claimed in claim 3, wherein:
the first coupling structure couples the first flange part to the first restraint member, and
the second coupling structure couples the second flange part to the second restraint member.

5. The battery module as claimed in claim 1, wherein the first and second coupling structures:
include a bolt and a nut, and
couple the one end plate and the restraint members with the bolt and the nut.

6. The battery module as claimed in claim 5, wherein:
the first coupling structure includes a bolt and a nut,
the second coupling structure includes a bolt and a nut, and
the bolt and nut of the first coupling structure are arranged asymmetrically with respect to the bolt and the nut of the second coupling structure about the central line.

7. The battery module as claimed in claim 5, wherein:
the first coupling structure includes a plurality of corresponding bolts and nuts arranged in a first configuration,
the second coupling structure includes a plurality of corresponding bolts and nuts arranged in a second configuration, and
the first configuration is asymmetrical with respect to the second configuration about the central line.

8. The battery module as claimed in claim 1, further comprising:
an upper connector extending along a third side of the plurality of battery units, the upper connector being coupled to the pair of end plates; and
a lower connector extending along a fourth side of the plurality of battery units, the lower connector being coupled to the pair of end plates.

9. A battery pack, comprising a plurality of battery modules,
a referential battery module of the plurality of battery modules including:
a referential pair of referential end plates facing each other, including a referential first end plate and a referential second end plate;
a plurality of referential battery units arranged in a first direction between the referential end plates;
at least one referential first restraint member extending along a referential first side of the plurality of referential battery units, the at least one referential first restraint member being coupled to the referential end plates;
a referential first coupling structure positioned along a referential first lateral edge of the referential first end plate at a referential first height from a referential bottom of the referential first end plate, the referential first coupling structure coupling one of the first pair of referential end plates to the at least one referential first restraint member;
a laterally adjacent battery module (LABM) being laterally adjacent to the referential battery module in a lateral arrangement direction perpendicular to the first direction and including:
a LABM pair of LABM end plates facing each other, including a LABM first end plate and a LABM second end plate;
a plurality of LABM battery units arranged in the first direction between the LABM end plates;
at least one LABM second restraint member extending along a LABM second side of the plurality of LABM battery units, the at least one LABM second restraint member being coupled to the LABM end plates;
a LABM second coupling structure positioned along a LABM second lateral edge of the LABM first end plate at a LABM second height from the LABM bottom of the LABM first end plate, the LABM second coupling structure coupling one LABM end plate of the LABM pair of LABM end plates to the at least one LABM second restraint member, wherein:
the referential first coupling structure of the referential battery module is adjacent to the LABM second coupling structure of the laterally adjacent battery module,
the referential first coupling structure of the referential battery module is asymmetrical with respect to the LABM second coupling structure of the laterally adjacent battery module about a plane perpendicular to the lateral arrangement direction of the referential battery module and the laterally adjacent battery module, the referential first lateral edge is free of any coupling structure at the LABM second height, and the LABM second lateral edge is free of any coupling at the referential first height.

10. The battery pack as claimed in claim 9, wherein the referential battery module further includes:
at least one referential second restraint member extending along a referential second side of the plurality of referential battery units, the at least one referential second restraint member being coupled to the referential end plates and being disposed opposite to the referential first restraint member, and a referential second coupling structure, the referential second coupling structure coupling the referential first end plate to the at least one referential second restraint member, wherein the referential first coupling structure is asymmetrical with respect to the referential second coupling structure of the referential battery module about a referential central line of the referential first end plate such that the referential second coupling structure couples the referential first end plate to the at least one referential second restraint member at a referential second height from the bottom of the referential first end plate, wherein the referential first lateral edge is free of any coupling structure at the referential second height and the referential second lateral edge is free of any coupling structure at the referential first height, wherein the referential second height is different from the referential first height, wherein the referential central line extends in a plane of the end plate and is equidistant from the referential first restraint member and the referential second restraint member, wherein the laterally adjacent battery module further includes:
at least one LABM first restraint member extending along a LABM first side of the plurality of battery units, the at least one LABM first restraint member being coupled to the LABM end plates, and a LABM first coupling structure, the LABM first coupling structure coupling one of the LABM end plates to the at least one LABM first restraint member, wherein the LABM first coupling structure is asymmetrical with respect to the LABM second coupling structure of the laterally adjacent battery module about a LABM central line of the LABM first end plate, the LABM central line extending in a plane of the LABM end plate and being equidistant from the LABM first restraint member and the LABM second restraint member such that the LABM first coupling structure couples the LABM first end plate to the at least one LABM first restraint member at a LABM first height from the bottom of the LABM end plate, and wherein the LABM first lateral edge is free of any coupling structure at the LABM second height and the LABM second lateral edge is free of any coupling structure at the LABM first height.

11. The battery pack as claimed in claim 10, wherein the referential first and second coupling structures include a bolt and a nut, and couple the referential first end plate and the referential restraint members with the bolt and the nut; and the LABM first and second coupling structures include a bolt and a nut, and couple the LABM first end plate and the LABM restraint members with the bolt and the nut.

12. The battery pack as claimed in claim 11, wherein:
the referential first coupling structure includes a bolt and a nut, the referential second coupling structure includes a bolt and a nut, and the bolt and nut of the referential first coupling structure is arranged asymmetrically about the referential central line with respect to the bolt and the nut of the referential second coupling structure; and the LABM first coupling structure includes a bolt and a nut, the LABM second coupling structure includes a bolt and a nut, and the bolt and nut of the LABM referential first coupling structure is arranged asymmetrically about the LABM central line with respect to the bolt and the nut of the LABM second coupling structure.

13. The battery pack as claimed in claim 11, wherein:
the referential first coupling structure includes a plurality of corresponding bolts and nuts arranged in a referential first configuration, the referential second coupling structure includes a plurality of corresponding bolts and nuts arranged in a referential second configuration, and the referential first configuration is asymmetrical about the referential central line with respect to the referential second configuration; and the LABM first coupling structure includes a plurality of corresponding bolts and nuts arranged in a LABM first configuration, the LABM second coupling structure includes a plurality of corresponding bolts and nuts arranged in a LABM second configuration, and the LABM first configuration is asymmetrical about the LABM central line with respect to the LABM second configuration.

14. The battery pack as claimed in claim 9, wherein each referential end plate includes:
a referential base plate disposed adjacent to the plurality of referential battery units;

a referential first flange part, the referential first flange part being bent from a referential first side of the referential base plate in a direction away from the plurality of referential battery units; and a referential second flange part, the referential second flange part being bent from a referential second side of the referential base plate in a direction away from the referential plurality of referential battery units; and each LABM end plate includes:

a LABM base plate disposed adjacent to the plurality of LABM battery units;

a LABM first flange part, the LABM first flange part being bent from a LABM first side of the LABM base plate in a direction away from the plurality of LABM battery units; and a LABM second flange part, the LABM second flange part being bent from a LABM second side of the LABM base plate in a direction away from the LABM plurality of LABM battery units.

15. The battery pack as claimed in claim 14, wherein:
the referential first coupling structure couples the referential first flange part to the referential first restraint member, and the referential second coupling structure couples the referential second flange part to the referential second restraint member; and the LABM first coupling structure couples the LABM first flange part to the LABM first restraint member, and the LABM second coupling structure couples the LABM second flange part to the LABM second restraint member.

16. The battery pack as claimed in claim 9, wherein each of the referential battery modules further includes:
   a referential upper connector extending along a third side of the plurality of referential battery units, the referential upper connector being coupled to the referential pair of referential end plates; and
   a referential lower connector extending along a fourth side of the plurality of referential battery units, the referential lower connector being coupled to the referential pair of referential end plates; and each of the LABM battery modules further includes:
   a LABM upper connector extending along a third side of the plurality of LABM battery units, the LABM upper connector being coupled to the LABM pair of LABM end plates; and
   a LABM lower connector extending along a fourth side of the plurality of LABM battery units, the LABM lower connector being coupled to the LABM pair of LABM end plates.

17. The battery pack as claimed in claim 9, wherein the plurality of LABM battery modules includes one set of laterally adjacent battery modules arranged in the lateral arrangement direction and another set of laterally adjacent battery modules arranged in a third direction perpendicular to the first direction and the lateral arrangement direction.

18. The battery pack as claimed in claim 17, wherein the other set of laterally adjacent battery modules arranged in the third direction are disposed such that first and second LABM coupling members of respective LABM battery modules adjacent to each other in the third direction are aligned in the third direction.

19. The battery pack as claimed in claim 9, wherein the plurality of referential battery modules are coupled together with another referential coupling structure, and the plurality of LABM battery modules are coupled together with another LABM coupling structure.

20. The battery pack as claimed in claim 9, wherein, in each referential battery module of the plurality of referential battery modules:
   the referential first restraint member includes all referential restraining members extending along the first side of the plurality of referential battery cells, and
   the referential second restraint member includes all referential restraining members extending along the second side of the plurality of referential battery cells; and each LABM battery module of the plurality of LABM battery modules:
   the LABM first restraint member includes all LABM restraining members extending along the first side of the plurality of LABM battery cells, and
   the LABM second restraint member includes all LABM restraining members extending along the second side of the plurality of LABM battery cells.

* * * * *